(12) United States Patent
Okamoto et al.

(10) Patent No.: US 8,051,281 B2
(45) Date of Patent: Nov. 1, 2011

(54) OPERATING SYSTEM STARTUP CONTROL METHOD AND INFORMATION PROCESSING APPARATUS

(75) Inventors: Keisuke Okamoto, Tokyo (JP); Takashi Kusumoto, Ikeda (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 423 days.

(21) Appl. No.: 12/446,649

(22) PCT Filed: Jan. 28, 2008

(86) PCT No.: PCT/JP2008/051209
§ 371 (c)(1),
(2), (4) Date: Apr. 22, 2009

(87) PCT Pub. No.: WO2008/093638
PCT Pub. Date: Aug. 7, 2008

(65) Prior Publication Data
US 2010/0049960 A1 Feb. 25, 2010

(30) Foreign Application Priority Data
Jan. 29, 2007 (JP) .................. 2007-018153

(51) Int. Cl.
*G06F 15/177* (2006.01)
(52) U.S. Cl. .................. 713/2; 713/1; 713/100
(58) Field of Classification Search .................. 713/1, 2, 713/100
See application file for complete search history.

(56) References Cited

U.S. PATENT DOCUMENTS

| 5,642,506 A | 6/1997 | Lee |
| 5,724,527 A | 3/1998 | Karnik et al. |
| 5,867,702 A | 2/1999 | Lee |
| 7,882,341 B2 * | 2/2011 | Rothman et al. .................. 713/1 |
| 2003/0131225 A1 * | 7/2003 | Bradley .................. 713/2 |
| 2005/0108511 A1 | 5/2005 | Zimmer et al. |
| 2006/0047939 A1 | 3/2006 | Devins et al. |
| 2006/0069904 A1 | 3/2006 | Hatakeyama |
| 2007/0033389 A1 * | 2/2007 | Shamia et al. .................. 713/2 |

FOREIGN PATENT DOCUMENTS

| JP | 06-149696 | 5/1994 |
| JP | 06-295289 A | 10/1994 |
| JP | 07-036704 A | 2/1995 |
| JP | 08-006914 A | 1/1996 |
| JP | 10-116262 | 5/1998 |
| JP | 2004-287618 A | 10/2004 |
| JP | 2006-350406 A | 12/2006 |

OTHER PUBLICATIONS

Xen Source; Xen: Enterprise Grade Open Source Virtualization, Inside Xen 3.0, A XenSource White Paper (available from http://www.intel.com/business/technologies/xen_virtualization_wp.pdf), No date, 5 pages.

* cited by examiner

*Primary Examiner* — Dennis M Butler
(74) *Attorney, Agent, or Firm* — Kenyon & Kenyon LLP

(57) ABSTRACT

An operating system startup control method includes the steps of continuing an operation of a program loader for a specific processor among program loaders for the other processors that are started up by turning on of the power supply to the plural processors, while terminating the program loaders for the other processors; starting up an OS bridge that manages a hardware resource shared by the plural processor, using the program loader and starting up an operating system corresponding to the specific processor and another operating system corresponding to the other processors, using the OS bridge that is started up.

2 Claims, 4 Drawing Sheets

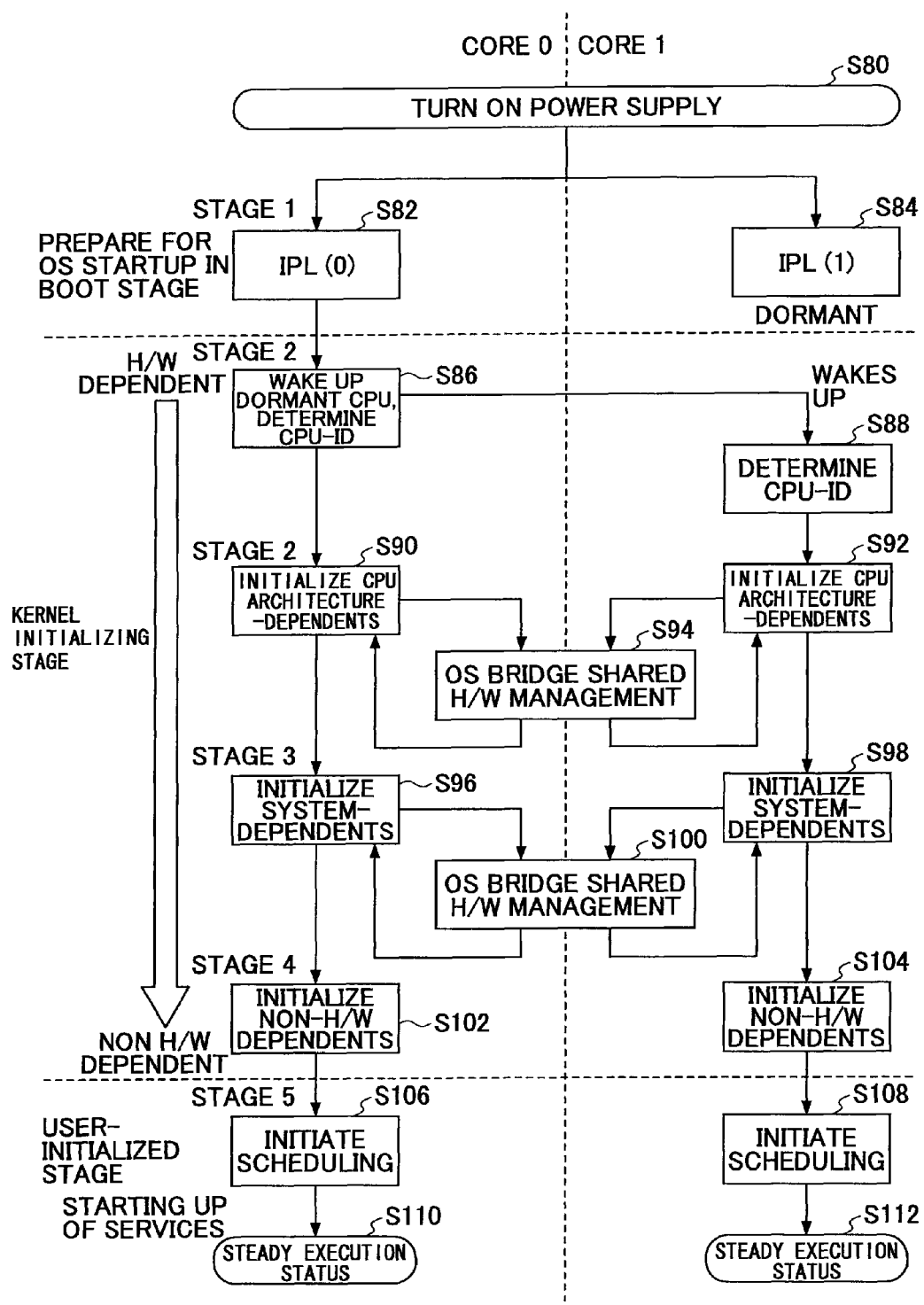

OPERATING SYSTEM STARTUP CONTROL METHOD AND INFORMATION PROCESSING APPARATUS

This is a 371 national phase application of PCT/JP2008/051209 filed 28 Jan. 2008, which claims priority to Japanese Patent Application No. 2007-018153 filed 29 Jan. 2007, the contents of which are incorporated herein by reference.

TECHNICAL FIELD

The present invention relates to techniques for starting up plural operating systems.

BACKGROUND ART

Conventionally, techniques for operating plural processors in parallel are known (see, e.g., Patent Document 1). Patent Document 1 discloses that a primary processor that manages a system as a whole reads an operating system (OS) in a primary system disc at the time of startup. In response to an operation request from the primary processor, master processors for managing individual groups are started up in parallel. Each of the master processors for the individual groups that has been started up reads an OS in a group system disc and starts up a secondary processor in the group. In this way, the individual group master processors and secondary processors are started up in parallel.

As another technology for operating plural OS's in parallel, a virtual machine system is known. In this virtual machine system, real hardware (physical resources), such as processors and memory, are virtualized and plural hardware environments (virtual machines) are generated. In each of such virtual machines, an individual OS can be run.

Patent Document 1: Japanese Laid-Open Patent Application No. 10-116262

DISCLOSURE OF INVENTION

Problem to be Solved by the Invention

Techniques are being developed for increasing the start-up speed of OS in multi-processor systems in which a multi-core processor having plural processor cores or plural processors are implemented.

In this respect, the aforementioned conventional technique according to Patent Document 1 is limited in increasing the start-up speed of the individual OS's of the multi-processor system because in this technique, the processors are started up sequentially from the primary processor, the master processors for the individual groups, the individual secondary processors, and so on.

On the other hand, in the aforementioned conventional virtual machine system, because a host OS has the function of centrally managing shared hardware of the system, the host OS needs to be started up before a guest OS. As a result, the system is unable to increase the start-up speed of the individual OS's in a multi-processor system. Thus, the advantage of the multi-processor system for higher processing speed cannot be fully exploited.

Thus, it is an object of the present invention to provide an operating system startup control method and an information processing apparatus by which individual OS's in a multi-processor system can be started up at increased speed.

Means for Solving the Problems

In a first aspect of the present invention, an operating system startup control method for starting an operating system processed by each of plural processors includes continuing an operation of an initial program loader for a specific one of the plural processors among the initial program loaders that are started up upon turning on of power supply to the plural processors, while deactivating an operation of an initial program loader for another processor other than the specific processor; starting up a managing program configured to manage a hardware resource shared by the plural processors, using the initial program loader for the specific processor; and starting up an operating system corresponding to the specific processor and another operating system corresponding to the other processor using the managing program that is started up.

In a second aspect, in the above operating system startup control method according to the first aspect, when the plural processors correspond to the same operating system, the method further includes the steps of starting up the operating system corresponding to the specific processor using the initial program loader for the specific processor without starting up the managing program; and starting up the operating system corresponding to the other processor using the operating system corresponding to the specific processor.

In a third aspect, in the above operating system startup control method according to the first or the second aspect, the plural processors comprise processor cores in a multi-core processor.

In a fourth aspect, an information processing apparatus includes plural processors for each of which an initial program loader is started up upon turning on of power supply. The plural processors include a specific processor for which an operation of the initial program loader that is started up is continued; and another processor for which an operation of the initial program loader that is started up is deactivated. A managing program configured to manage a hardware resource shared by the plural processors is started up by the initial program loader for the specific processor. An operating system corresponding to the specific processor and another operating system corresponding to the other processor are started up by the managing program that is started up.

In a fifth aspect, in the information processing apparatus according to the fourth aspect, when the operating systems to which the plural processors correspond are the same, the operating system corresponding to the specific processor is started up by the initial program loader for the specific processor without starting up the managing program, and the operating system corresponding to the other processor is started up by the operating system corresponding to the specific processor.

In a sixth aspect, in the information processing apparatus according to the fourth or fifth aspect, the plural processors comprise processor cores in a multi-core processor.

Effects of the Invention

In accordance with the present invention, each of plural OS's in a multi-processor system can be started up at higher speed.

BRIEF DESCRIPTION OF THE DRAWINGS

FIG. 5 shows a process flow in a multi-core processor of a dual-core configuration where two identical OS's are started up in parallel.

DESCRIPTION OF REFERENCE NUMERALS

10 Multi-core processor
20 RAM
30 ROM
40 Input/output unit (I/O)
50 OS bridge

BEST MODE FOR CARRYING OUT THE INVENTION

Figure 1:
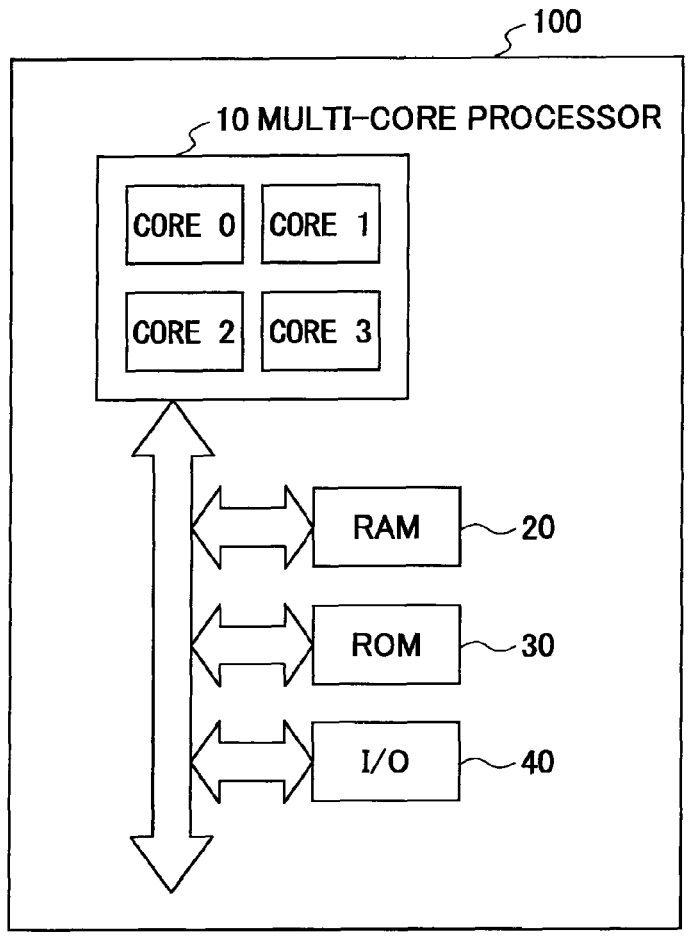
FIG. 1 shows a hardware structure of a computer 100 embodying an information processing apparatus according to the present invention.

In the following, preferred embodiments of the present invention are described with reference to the drawings. FIG. 1 shows a hardware structure of a computer 100 embodying an information processing apparatus according to the present invention. The computer 100 may include a computer having a vehicle control function (control system ECU) or a computer having a multimedia function (information system ECU). Examples of the control system ECU include an engine ECU for controlling an engine, a steering ECU for steering control, and a brake ECU for brake control. Examples of the information system ECU include a vehicle navigation computer, a DVD (digital versatile disc) or video computer, an Internet access computer, and a communications computer for communicating with other vehicles or an external communications facility, such as roadside infrastructure or a management center.

As shown in FIG. 1, the computer 100 includes a read-only memory (ROM) 30 for storing an OS and various programs that run on the OS, such as an application program for realizing the aforementioned vehicle control function or engine control function. The computer 100 also includes a multi-core processor 10 for processing such programs, a random access memory (RAM) 20 providing a working area for the programs, and an I/O 40 that is an interface for the reception and transmission of signals with an external device, such as an input circuit or an output circuit that are not shown.

As shown in FIG. 1, the multi-core processor 10 has multiple processor cores, each of which is a microprocessor integrating two or more processor cores on a single package. The processor cores in the multi-core processor 10 operate independently from each other. The multi-core processor 10 contains the four processor cores 0, 1, 2, and 3. The cores 0, 1, 2, and 3, either independently or in cooperation, process the OS and the aforementioned application programs that run on the OS for realizing vehicle control function or engine control function. Upon generation of an interrupt instructing an execution of a program, each of the cores 0, 1, 2, and 3 reads the program from the ROM 30 to the RAM 20 and executes it.

The OS's processed by the cores 0, 1, 2, and 3 may include a realtime OS (hereafter referred to as a "RT-OS"), or a multimedia OS ("MM-OS"). The OS's processed by the individual cores may not be the same. By partitioning the multi-processor system into independently operable systems each with a processor, the multiple OS's can be operated in parallel, whereby the system can be diversified or increased in size.

The RT-OS has enhanced functions for batch processing and TSS (Time Sharing System) in order to give priority to realtime processing. In the case of a control program used in a control system ECU for vehicle control, the RT-OS is used because it is capable of processing certain processes in real time that need the realtime processing in order to ensure high levels of control response and safety. Examples of the RT-OS include OSEC and ITRON.

The MM-OS is superior to the RT-OS in handling compression/expansion processing such as an MPEG codec, user interface processes such as GUI (Graphical User Interface), and multimedia processes such as an Internet connection process including security management. In an information system ECU, an MM-OS capable of realizing required multimedia processing is used. Examples of the MM-OS are Linux (registered trademark) and QNX (registered trademark).

When power is supplied to the multi-core processor 10 from a power supply circuit (not shown), the internal cores 0, 1, 2, and 3 are also supplied with power. Of the cores 0, 1, 2, and 3 thus supplied with power, an initial program loader (IPL) of the core 0 reads an OS bridge 50 (program) stored in the ROM 30 into the RAM 20 and starts it up. The IPL is a program for executing a preparatory process for booting the OS at the booting stage, including initialization of memory.

Figure 2:
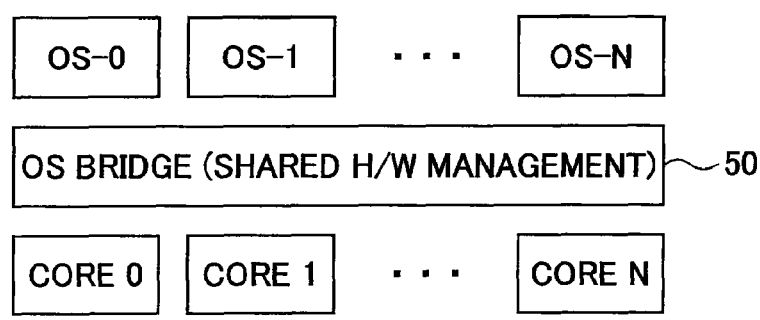
FIG. 2 shows a conceptual diagram of an OS bridge 50.

FIG. 2 shows a conceptual diagram of the OS bridge 50. The OS bridge 50 controls the hardware resources that the individual cores share, such as the RAM 20 and the I/O 40, and performs exclusive access control for the hardware resources ("shared hardware managing function"). For example, the OS bridge 50 performs a process to allocate the shared hardware resources to each of the OS-0 operated by the core 0, OS-1 operated by the core 1, . . . , and the OS-N operated by the core N, in accordance with certain task switching timing or at predetermined periods. The OS bridge 50 also has a function of starting up each OS. Even after the individual OS's are started up by the OS bridge 50, each started-up OS can call the OS bridge 50 and utilize its shared hardware managing function.

Figure 3:
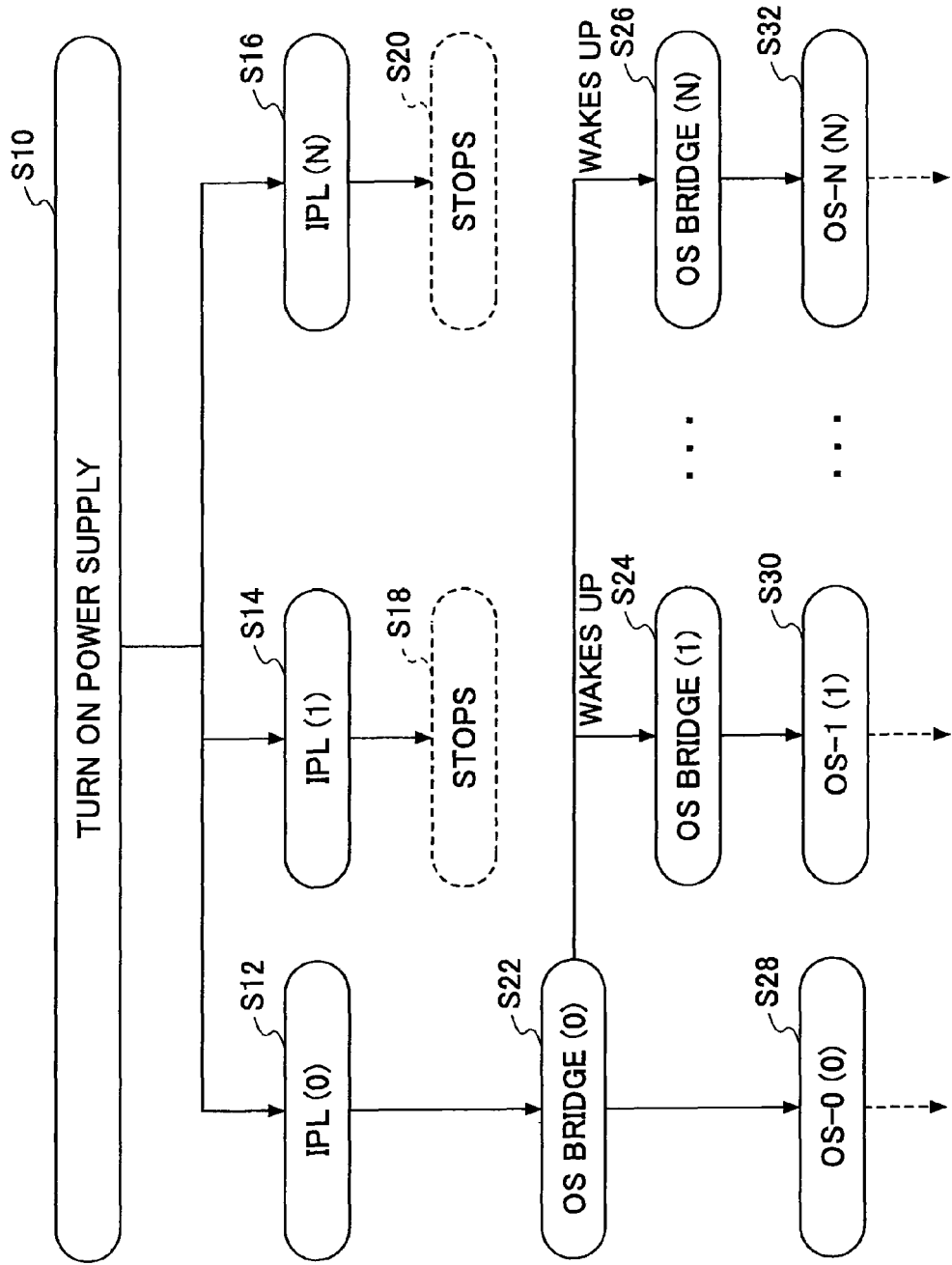
FIG. 3 shows an outline of an operating system startup control method according to an embodiment of the present invention.

With reference to FIG. 3, an operating system startup control method according to an embodiment of the present invention is described. FIG. 3 illustrates the partitioning of a multi-processor system into N partitions with individual processors. When power is supplied to the multi-processor system (step 10), the IPL of each of the cores supplied with power starts up (steps 12, 14, and 16). Once the system power supply is provided, the IPL's of the cores other than the core 0, i.e., the IPL (1) of the core 1 to the IPL (N) of the core N are deactivated (steps 18 and 20). The IPL(0) of the core 0 starts up the OS bridge(0) after setting an operating environment, including initialization of a minimum memory system (step 22). The OS bridge (0) started up by the IPL(0), after initializing a system necessary for communication between the cores, starts up the other cores (1) to (N) that have been deactivated (steps 24, 26). The started cores (1) to (N) start up the individual OS bridges (1) to (N) after setting an operating environment, including initialization of a minimum memory system. Thus, the OS bridges operate in parallel for the individual cores.

Each of the OS bridges operated by the individual cores then acquires a core number from a nonvolatile memory such as the ROM 30. The OS bridge then selects an OS to be started up based on a predetermined correspondence between the core number and the OS to be installed on the core, and gives control to an entry point of the selected OS. The individual cores then start a startup process for the corresponding OS's in parallel. In the process of starting up the individual OS, when accessing the hardware resources shared among the OS's, contention for hardware resources is avoided by performing an exclusive access control by the shared hardware management function of the OS bridge.

Figure 4:
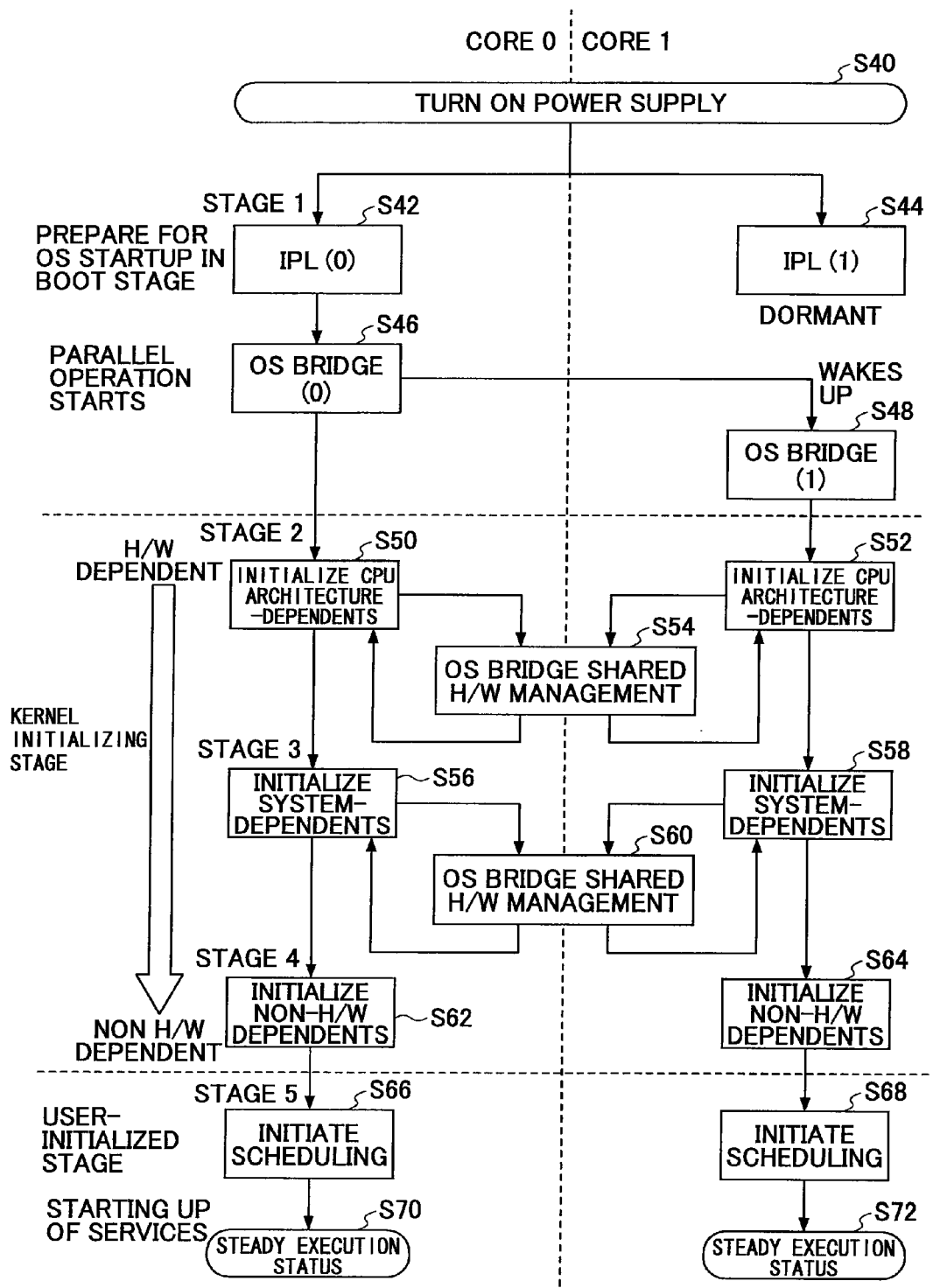
FIG. 4 shows a process flow in a multi-core processor of a dual-core configuration where two OS's are started up in parallel.

FIG. 4 shows a process flow in a case where two OS's are started up in parallel in a multi-core processor of a dual-core configuration. A storage unit for storing the IPL of the core 0 is connected to the core 0, and a storage unit for storing the IPL of the core 1 is connected to the core 1. These storage units may include the ROM 20. After system power is supplied (step 40), the IPL (0) for the core 0 is started up in the powered core 0, in a booting stage for preparing for the startup of an OS (step 42). In the powered core 1, the IPL (1) for the core 1 is started up (step 44). After making a minimum initial setting, the IPL (1) once puts the core 1 into a dormant standby status. On the other hand, the IPL(0) reads the OS bridge from the ROM 30 into the RAM 20, thereby starting up the OS bridge (0) (step 46). The OS bridge (0) operated by the core 0 wakes up the dormant core 1. The awakened IPL(1) of the core 1 reads the OS bridge from the ROM 30 into the RAM 20, thereby starting up the OS bridge (1) (step 48). At this stage, the OS bridges are operating in parallel in the core 0 and the core 1.

The OS bridge (0) then selects the OS-0 corresponding to the core 0 and shifts to the entry point of the OS-0, thereby starting up the OS-0. Thus, the startup process for the OS-0(0) is started by the core 0. In parallel, the OS bridge (1) similarly selects the corresponding OS-1 and shifts to the entry point of the OS-1, thus starting up the OS-1. In this way, the startup process for the OS-1(1) is started by the core 1.

Once the startup process for each OS is started, the kernel and the user interface portion are initialized, as in a conventional OS startup process. In the kernel initializing stage, initialization is performed sequentially from hardware-dependent portions to non-hardware-dependent portions. Specifically, CPU architecture-dependent portions are initialized (steps 50, 52), system dependent portions are initialized (steps 56, 58), and then non-hardware-dependent portions are initialized (steps 62, 64). In the initialization stage for the CPU architecture-dependent portions or system dependent portions, each of the OS-0(0) being started up by the core 0 and the OS-1(1) being started up by the core 1 calls the OS bridge and utilizes its shared hardware function in order to avoid hardware resource contention (steps 54, 60).

Then in the initialization stage for the user interface portions, scheduling begins (steps 66, 68), whereby the process shifts to a steady execution status (steps 70, 72) and the OS starts up services. Thus, the startup of the OS is completed.

FIG. 5 shows a process flow in a case where two identical OS's are started up in parallel in a multi-core processor of a dual-core configuration. In a system having a multi-core processor, when the same OS's are started up in the plural cores in parallel, the OS's can be directly stared up from the IPL by skipping the OS bridge. In this case, the OS itself, not the OS bridge, can activate the other dormant cores, and modify the operation of each core based on a determination of the CPU-ID, such as which hardware should be used. As in the case of FIG. 4, when the individual OS's perform initialization processing simultaneously in parallel, in order to perform the exclusive access control to the shared hardware, the shared hardware managing function of the OS bridge can be called even during the running of the OS.

As in the case of FIG. 4, after system power is supplied (step 80), in the booting stage in preparation for the starting up of the OS, the IPL(0) of the core 0 that is powered is started up (step 82). In the core 1 that is powered, the IPL(1) of the core 1 is started up (step 84). After making a minimum initial setting, the IPL(1) once puts the core 1 in a dormant standby status.

The IPL(0) then acquires its core number and makes an ID determination, whereby the OS-0 corresponding to the core 0 is selected. The IPL(0) then shifts to the entry point of the OS-0 and starts up the OS-0. Thus, the startup process for the OS-0(0) is started by the core 0. The OS-0(0) operated by the core 0 acquires the core number of the dormant core 1 and performs ID determination, thereby selecting the OS-0 corresponding to the core 1 and shifting to the entry point of the OS-0, whereby the OS-0 is started up (step 88). Thus, the startup process for the OS-0(1) is started by the core 1. The process after the starting of the startup process for each of the OS's is the same as described with reference to FIG. 4 and therefore the description is omitted. Thus in the case of FIG. 5 where the processors have the same OS, the OS of a dormant core is started up in an OS that is started up, whereas in the case of FIG. 4 where the processors have different OS's, the OS of a dormant core is started up before the OS is started up.

Thus in accordance with the foregoing embodiment, when plural processor cores are started up in parallel, the individual cores can be started up at higher speed (i.e., the booting timing of each core can be forwarded) by taking the shared hardware managing function out of the OS as an OS bridge. For example, when the core 0 operates the host OS and the other cores operate guest OS's, by separating the shared hardware managing function from the host OS where it is normally contained, the guest OS's of the other cores can be started up even before the starting up of the host OS is completed. Thus, contention for hardware resources among the individual OS's can be avoided by the OS bridge having the shared hardware managing function.

When the plural cores use the same OS, the startup speed can be made even faster because the OS of the core 0 starts up the other OS's while skipping the startup process by the OS bridge.

Although this invention has been described in detail with reference to certain embodiments, variations and modifications exist within the scope and spirit of the invention as described and defined in the following claims.

For example, although the foregoing embodiments are directed to the plural processor cores in a multi-core processor, an embodiment of the present invention may be directed to plural single-core processors. Furthermore, the number of the cores in the foregoing embodiments is merely exemplary and may be varied in other embodiments.

The present application is based on the Japanese Priority Application No. 2007-018153 filed Jan. 29, 2007, the entire contents of which are hereby incorporated by reference.

The invention claimed is:

1. An operating system startup control method for starting an operating system processed by each of plural processors, the method comprising the steps of:
    continuing an operation of an initial program loader for a specific one of the plural processors among a plurality of initial program loaders that are started up upon turning on of power supply to the plural processors, while deactivating an operation of an initial program loader for another processor other than the specific processor;
    starting up a managing program configured to manage a hardware resource shared by the plural processors, using the initial program loader for the specific processor; and
    starting up an operating system corresponding to the specific processor and another operating system corresponding to the other processor using the managing program that is started up.

2. An information processing apparatus having plural processors for each of which an initial program loader is started up upon turning on of power supply,
    the plural processors including:
    a specific processor for which an operation of the initial program loader that is started up is continued; and
    another processor for which an operation of the initial program loader that is started up is deactivated,
    wherein a managing program configured to manage a hardware resource shared by the plural processors is started up by the initial program loader for the specific processor, and
    wherein an operating system corresponding to the specific processor and another operating system corresponding to the other processor are started up by the managing program that is started up.

* * * * *